United States Patent
Wyrwas et al.

(10) Patent No.: US 9,791,557 B1
(45) Date of Patent: Oct. 17, 2017

(54) SYSTEM AND METHOD FOR MULTI-AREA LIDAR RANGING

(71) Applicant: QUALCOMM Incorporated, San Diego, CA (US)

(72) Inventors: John Wyrwas, Mountain View, CA (US); Volodimir Slobodyanyuk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/267,048

(22) Filed: Sep. 15, 2016

(51) Int. Cl.
- *G01J 5/02* (2006.01)
- *G01S 7/486* (2006.01)
- *G01S 17/10* (2006.01)
- *G01S 13/10* (2006.01)
- *G01S 15/10* (2006.01)

(52) U.S. Cl.
CPC ............ *G01S 7/4865* (2013.01); *G01S 13/10* (2013.01); *G01S 15/10* (2013.01); *G01S 17/10* (2013.01)

(58) Field of Classification Search
CPC .. H02J 7/0029; G06K 9/32; G01J 1/32; G01J 7/10861; G01S 7/497; G01C 15/00
See application file for complete search history.

(56) References Cited

U.S. PATENT DOCUMENTS

| | | | | |
|---|---|---|---|---|
| 5,675,326 A * | 10/1997 | Juds | ....................... | G01S 17/936 180/167 |
| 7,949,344 B1 * | 5/2011 | Mulcay | ................. | H04W 16/14 455/426.1 |
| 8,744,126 B1 * | 6/2014 | Rohrschneider | ......... | G06K 9/44 382/100 |
| 8,761,594 B1 * | 6/2014 | Gross | ................... | H04N 5/2256 396/155 |
| 2005/0205755 A1 * | 9/2005 | Walsh | ...................... | G01S 7/497 250/205 |
| 2008/0259162 A1 * | 10/2008 | Aoki | ........................ | G06K 9/32 348/159 |
| 2009/0273770 A1 | 11/2009 | Bauhahn et al. | | |
| 2011/0032508 A1 | 2/2011 | Ludwig et al. | | |
| 2012/0025989 A1 * | 2/2012 | Cuddihy | ............ | G06K 9/00369 340/573.1 |
| 2012/0229028 A1 * | 9/2012 | Ackermann | ........... | B60Q 1/085 315/82 |
| 2012/0242974 A1 | 9/2012 | Lavalley et al. | | |

(Continued)

*Primary Examiner* — Kiho Kim

(74) *Attorney, Agent, or Firm* — Kilpatrick Townsend & Stockton/Qualcomm

(57) ABSTRACT

Methods, systems, computer-readable media, and apparatuses for outputting light are presented. A method includes outputting, via a propagation wave source and toward a field of view (FOV), at least one propagated wave at a first power, receiving, via a sensor, a reflection of the at least one propagated wave at the first power reflected off one or more objects within the FOV, classifying, via a processor, one or more areas within the FOV into safe areas and unsafe areas based at least in part on the received reflection of the propagated wave at the first power, wherein the safe areas are deemed to be safe to receive at least one propagated wave at a second power, and outputting, via the propagation wave source and toward the safe area, the at least one propagated wave at the second power. The first power may be a lower power than the second power.

31 Claims, 7 Drawing Sheets

(56) References Cited

U.S. PATENT DOCUMENTS

| | | | | |
|---|---|---|---|---|
| 2014/0118551 A1* | 5/2014 | Ikeda | ............... | B60R 1/00 |
| | | | | 348/148 |
| 2015/0138529 A1* | 5/2015 | Singer | ............... | G01C 15/002 |
| | | | | 356/4.01 |
| 2015/0301167 A1* | 10/2015 | Sentelle | ............... | A61B 5/0205 |
| | | | | 342/22 |

* cited by examiner

SYSTEM AND METHOD FOR MULTI-AREA LIDAR RANGING

BACKGROUND

Aspects of the disclosure relate to light detection and ranging (LIDAR) systems. LIDAR (also known as LADAR) systems, such as scanning LIDARs and flash LIDARs, are used in a variety of applications. For example, LIDAR systems can be used to detect the presence of, and distance to, objects within a field of view ("FOV") of the device. These applications include, for example, automotive, consumer electronics, and industrial. For use in these applications, LIDAR systems must meet regulatory requirements on beam hazards to prevent health damage to humans. These regulatory requirements are described by, for example, ANSI American National Standard for Safe Use of Lasers (ANSI Z136.1-2014) and the United States Food and Drug Administration (FDA).

BRIEF SUMMARY

Certain implementations are described that include systems and methods for dividing a field of view (FOV) into "safe" and "unsafe" areas for purposes of outputting propagated waves (e.g., light/laser beams) for ranging operations. The relative higher power or lower power of propagated waves may be defined as the relative instantaneous peak power of the wave as compared to some threshold instantaneous peak power. It may also be defined as the average power of the wave over a time interval associated with a regulatory or physical effect (e.g. 18 microseconds, e.g. 10 seconds), as compared to some threshold average power. The "safe" areas may be considered areas where a higher power propagated wave (e.g., a high power laser beam) may be used without the potential of risking damage to an object sensitive to higher power propagated waves (e.g., a human or animal eye). The "unsafe" areas may be considered areas where a higher power propagated wave should not be used because of potential risk of damage to an object sensitive to a higher power propagated wave. The classification of the separate areas (e.g., safe and unsafe areas) within the FOV may be carried out by first scanning the entire FOV with a propagated wave having a first power deemed to be safe for sensitive objects within a certain distance (e.g., D1). After detecting the presence (or absence) of objects within the FOV via the first scan, the FOV may be classified into the separate areas based on the detection of the objects within the FOV. A series of propagated waves having a second power that is higher than the first power may then be output into the safe area (for increased distance ranging), while the propagated waves having the first power deemed to be safe for sensitive objects may continue to be output within the unsafe areas for ranging operations.

Additionally, certain implementations are described that include systems and methods to maximize the amount of light that a LIDAR system may emit, while still adhering to eye safety limits. The amount of light that a LIDAR system may safely emit may be guided by three restrictions: (1) the maximum energy in a single laser light pulse entering a human eye; (2) the maximum energy per pulse in in a chain of pulses entering a human eye; and (3) the average laser power that enters a human eye.

In some implementations, a method for sensing one or more objects includes outputting, via a propagation wave source and toward a field of view (FOV), at least one propagated wave at a first power. The method also includes receiving, via a sensor, a reflection of the at least one propagated wave at the first power reflected off one or more objects within the FOV. The method additionally includes classifying, via a processor, one or more areas within the FOV into safe areas and unsafe areas based at least in part on the received reflection of the propagated wave at the first power, wherein the safe areas are deemed to be safe to receive at least one propagated wave at a second power. The method further includes outputting, via the propagation wave source and toward the safe area, the at least one propagated wave at the second power.

In some implementations, the unsafe areas deemed to be unsafe to receive the at least one propagated wave at the second power.

In some implementations, the method also includes continuing to output, via the propagation wave source and toward the unsafe area, the at least one propagated wave at the first power.

In some implementations, the method also includes measuring a characteristic of the received reflection of the at least one propagated wave at the first power reflected off one or more objects within the FOV and calculating a distance to the one or more objects within the FOV based at least in part on the measured characteristic of the received reflection of the at least one propagated wave at the first power.

In some implementations, the method also includes receiving, via the sensor, a reflection of the at least one propagated wave at the second power reflected off one or more objects within the safe area, measuring a characteristic of the received reflection of the at least one propagated wave at the second power reflected off one or more objects within the safe area, and calculating a distance to the one or more objects within the safe area based at least in part on the measured characteristic of the received reflection of the at least one propagated wave at the second power.

In some implementations, the at least one propagated wave at the first power is output at a first wavelength and the at least one propagated wave at the second power is output at a second wavelength.

In some implementations, the first wavelength is a wavelength in the near infrared, and the second wavelength is a different wavelength in the near infrared.

In some implementations, the propagation wave source comprises at least one of a light detection and ranging (LIDAR) source, radio detection and ranging (RADAR) source, or sound navigation and ranging (SONAR) source.

In some implementations, system for sensing one or more objects includes a propagation wave source configured to output propagated waves, a sensor configured to receive a reflection of propagated waves, and a processor coupled to the propagation wave source and the sensor. The processor is configured to output, via the propagation wave source and toward a field of view (FOV), at least one propagated wave at a first power, receive, via the sensor, a reflection of the at least one propagated wave at the first power reflected off one or more objects within the FOV, classify one or more areas within the FOV into safe areas and unsafe areas based at least in part on the received reflection of the propagated wave at the first power, wherein the safe areas are deemed to be safe to receive at least one propagated wave at a second power, and output, via the propagation source and toward the safe area, the at least one propagated wave at the second power.

In some implementations, an apparatus for sensing one or more objects includes means for outputting, toward a field of view (FOV), at least one propagated wave at a first power.

The apparatus also includes means for receiving a reflection of the at least one propagated wave at the first power reflected off one or more objects within the FOV. The apparatus also includes means for classifying one or more areas within the FOV into safe areas and unsafe areas based at least in part on the received reflection of the propagated wave at the first power, wherein the safe areas are deemed to be safe to receive at least one propagated wave at a second power. The apparatus also includes means for outputting, toward the safe area, the at least one propagated wave at the second power.

In some implementations, one or more non-transitory computer-readable media store computer-executable instructions that, when executed, cause one or more computing devices to output, toward a field of view (FOV), at least one propagated wave at a first power, receive a reflection of the at least one propagated wave at the first power reflected off one or more objects within the FOV, classify one or more areas within the FOV into safe areas and unsafe areas based at least in part on the received reflection of the propagated wave at the first power, wherein the safe areas are deemed to be safe to receive at least one propagated wave at a second power, and output, toward the safe area, the at least one propagated wave at the second power.

BRIEF DESCRIPTION OF THE DRAWINGS

Aspects of the disclosure are illustrated by way of example. In the accompanying figures, like reference numbers indicate similar elements.

DETAILED DESCRIPTION

Several illustrative implementations will now be described with respect to the accompanying drawings, which form a part hereof. While particular implementations, in which one or more aspects of the disclosure may be implemented, are described below, other implementations may be used and various modifications may be made without departing from the scope of the disclosure or the spirit of the appended claims.

A LIDAR system, also referred to as a laser detection and ranging (LADAR) system, is an active remote sensing system that can be used to obtain the range from a source to one or more points on a target. A LIDAR uses a light beam, typically a laser beam, to illuminate the one or more points on the target. Compared with other light sources, a laser beam may propagate over long distances without spreading significantly (highly collimated), and can be focused to small spots so as to deliver high optical power densities over long distance and provide fine resolution. The laser beam may be modulated such that the transmitted laser beam includes a series of pulses. The transmitted laser beam may be directed to a point on the target, which may reflect the transmitted laser beam. The laser beam reflected from the point on the target can be measured, and the time-of-flight (ToF) from the time a pulse of the transmitted light beam is transmitted from the source to the time the pulse arrives at a detector near the source or at a known location may be measured. The range from the source to the point on the target may then be determined by, for example, $r=c\times t/2$, where r is the range from the source to the point on the target, c is the speed of light in free space, and t is the ToF of the pulse of the light beam from the source to the detector.

Figure 1:
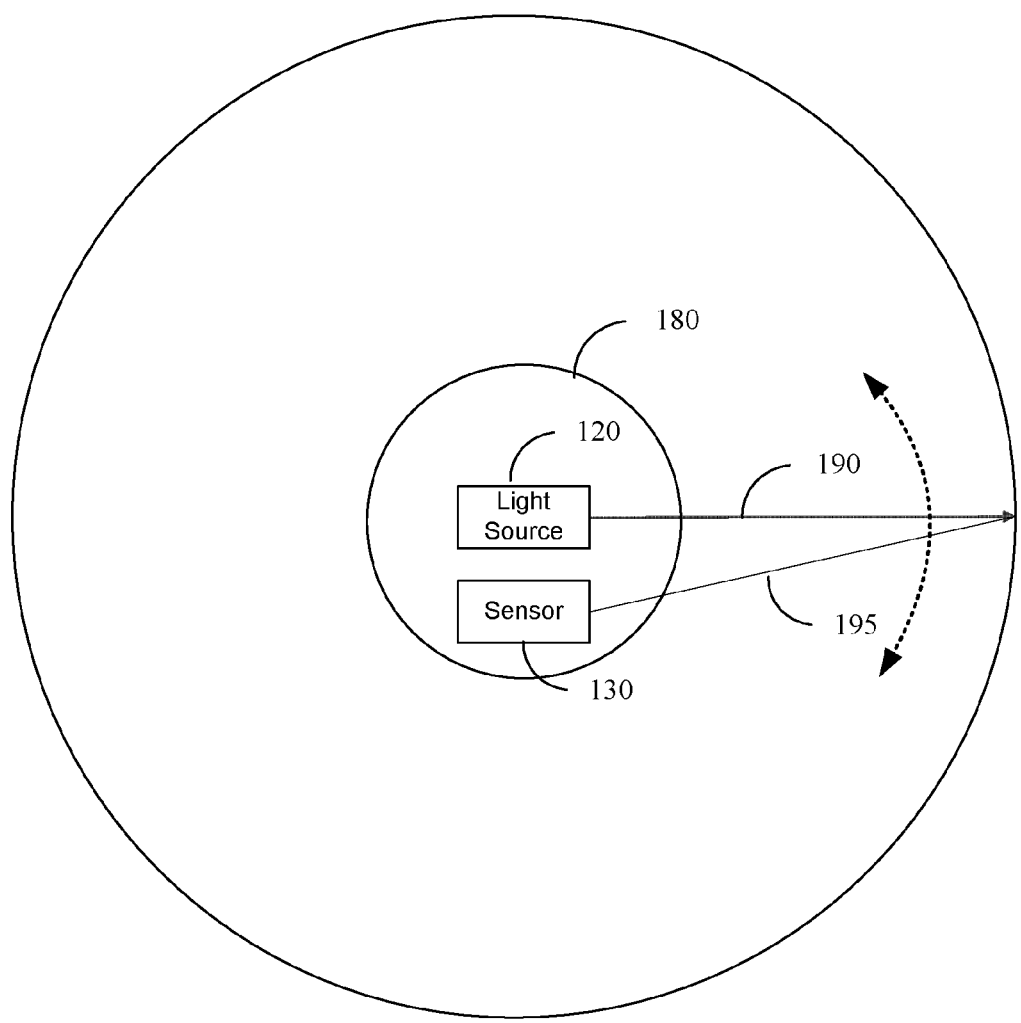
FIG. 1 is a simplified block diagram of an example light detection and ranging (LIDAR) system.

FIG. 1 is a simplified block diagram of an example system 100. System 100 may include a scanning platform 180 that may be used to scan the laser beam in different directions. Scanning platform 180 may include a light source 120 and a sensor 130. Light source 120 may emit a light beam 190 towards a target object, which may reflect a portion of light beam 190 as a reflected beam 195. The reflected beam 195 may then be collected and detected by sensor 130.

Light source 120 may include an optical source, such as a laser, a laser diode, a vertical cavity surface-emitting laser (VCSEL), a light-emitting diode (LED), or other optical source. The laser may be, for example, an infrared pulsed fiber laser or other mode-locked laser capable of various output wavelengths.

Sensor 130 may include a detector having a working (sensitive) wavelength comparable with the wavelength of the laser source. The detector may be a high speed photodetector, for example, a PIN photodiode with an intrinsic region between a p-type semiconductor region and an n-type semiconductor region, or an InGaAs avalanche photodetector (APD). In some systems, sensor 130 may include a silicon photomultiplier (SiPM) sensor.

Scanning platform 180 may use many different types of beam scanning mechanisms, for example, a rotating platform driven by a motor, a multi-dimensional mechanical stage, a Galvo-controlled mirror, a microelectromechanical (MEMS) mirror driven by micro-motors, a piezoelectric translator/transducer using piezoelectric material such as a quartz or lead zirconate titanate (PZT) ceramic, an electromagnetic actuator, or an acoustic actuator. Scanning platform 180 may be a platform without mechanical movement of any component, for example, using a phased array technique where phases of laser beams from lasers in a one-dimensional (1-D) or two-dimensional (2-D) laser array may be modulated to alter the wavefront of the superimposed laser beam.

As scanning platform 180 points light beam 190 at different directions using any beam scanning mechanism, such as the scanning mechanism described above, light beam 190 may illuminate different target objects or different locations of a target object during the scanning. During the scanning, reflected beam 195 from the different target objects or different locations of the target object may be collected and detected by sensor 130 to generate detection signals, which may then be used by an analyzer or a processor to determine the characteristics of the target objects, such as their distances from system 100 and their reflective properties, or generate an image of the scanned area.

To achieve a 3-dimensional (3-D) scanning of the environment, a LIDAR system may use either multiple sets of lasers/detectors or a 2-D scanning mechanism, such that the overall system can scan not only in one plane as shown in FIG. 1, but also in a plurality of different planes.

Figure 2:
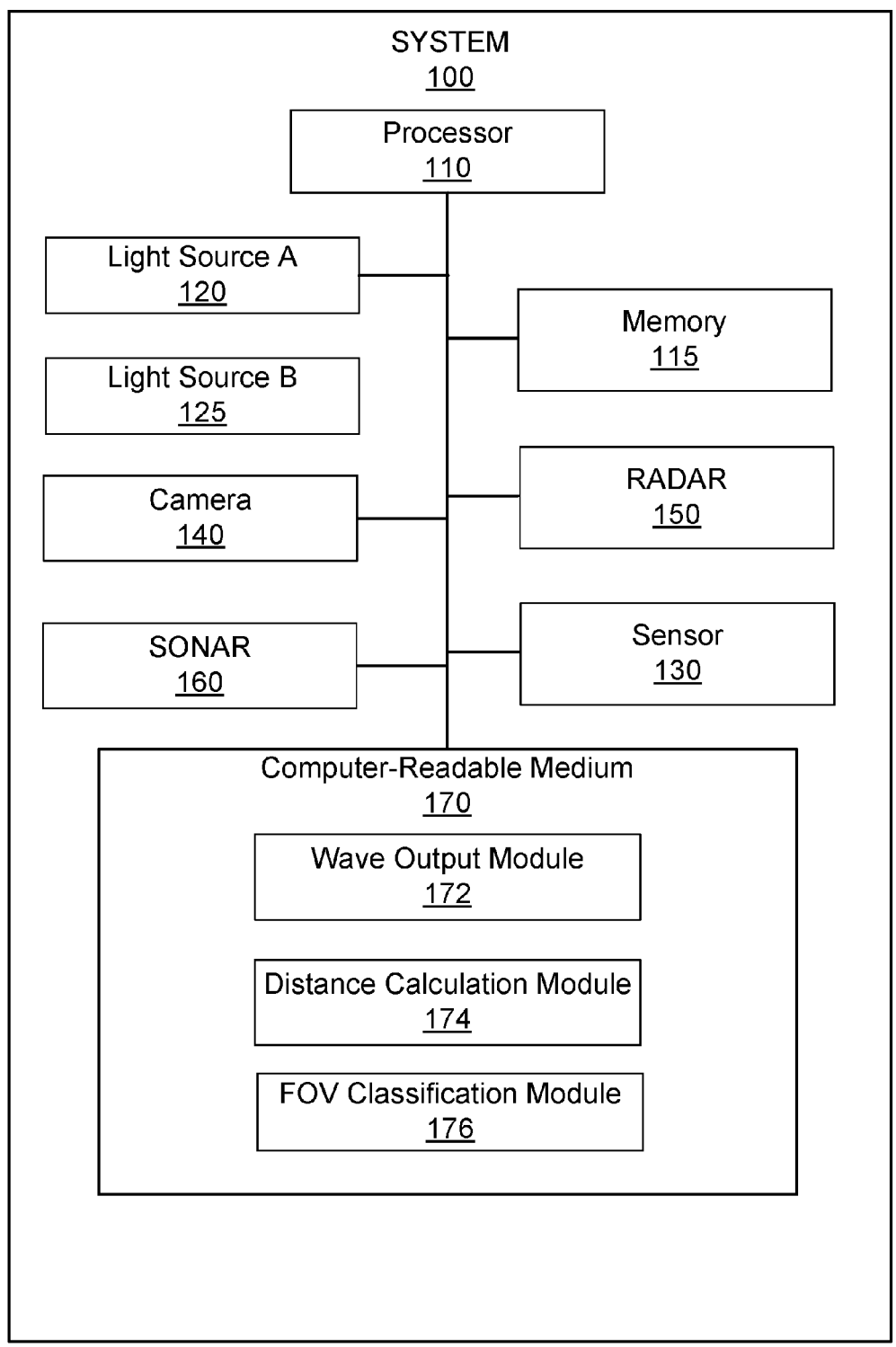
FIG. 2 illustrates further components of the LIDAR system, according to some implementations.

FIG. 2 illustrates further components of the system 100, according to some implementations. The system 100 may include a processor 110, light source A 120, light source B 125, sensor 130, camera 140, RADAR device 150, SONAR device 160, memory 115, and computer-readable medium 170.

Processor 110 may include one or more general-purpose processors operable to carry out instructions on the System 100. The processor 110 is coupled to other units of the System 100 including light source 120, memory 115, sensor 130, camera 140, RADAR device 150, SONAR device 160, and computer-readable medium 170.

Memory 115 may include any magnetic, electronic, or optical memory. It can be appreciated that memory 115 may include any number of memory modules. An example of memory 115 may include dynamic random access memory (DRAM). In some implementations, memory 115 may be used to store various data that can be analyzed for sleep tracking functions.

Light source A 120 and light source B 125 may each include an optical source, such as a laser, a laser diode, a vertical cavity surface-emitting laser (VCSEL), a light-emitting diode (LED), or other optical source. The laser may be, for example, an infrared pulsed fiber laser or other mode-locked laser capable of various output wavelengths. Light source A 120 may be configured to output light beam(s) at a first wavelength and first power and light source B 125 may be configured to output light beam(s) at a second wavelength and a second power. In some implementations, the second power may be a lower power than the first power.

Sensor 130 may be configured to facilitate a measurement(s) of reflected light from the light source 120 reflected off one or more objects with the FOV. The sensor 130 may include one or more photodiodes. Sensor 130 may be able to detect reflected light at various wavelengths. The sensor 130 is an example of means for receiving a reflection of the at least one propagated wave at the first power reflected off one or more objects within the FOV.

Camera 140 is configured to capture one or more images via a lens located on the body of the System 100. The captured images may be still images or video images. The camera 140 may include a CMOS image sensor to capture the images. Various applications running on processor 110 may have access to camera 140 to capture images. It can be appreciated that camera 140 can continuously capture images without the images actually being stored within the System 100. Captured images may also be referred to as image frames. In some implementations, camera 140 may be a stereo-camera or depth-camera.

RADAR device 150 may include any object-detection system that uses radio waves to determine the range, angle, or velocity of objects. RADAR device 150 may include a transmitter producing electromagnetic waves in the radio or microwaves domain, an emitting antenna, a receiving antenna to capture any returns from objects in the path of the emitted signal, and a receiver and processor to determine properties of the object(s).

SONAR device 160 may include and device that uses sound propagation to navigate, communicate with or detect an object. SONAR device 160 may either be a passive sonar or an active sonar (emitting pulses of sounds and listening for echoes). SONAR may be used as a means of acoustic location and of measurement of the echo characteristics of "targets." The acoustic frequencies used in sonar systems vary from very low (infrasonic) to extremely high (ultrasonic).

Computer-readable medium 290 may include a magnetic, an electronic, an optical, or other computer-readable storage medium. In this exemplary implementation, computer-readable medium 290 includes wave output module 172, distance calculation module 174, FOV classification module 176, and light beam energy calculation module.

Wave output module 172 may be configured to, when executed by processor 110, facilitate the output of waves. For example, wave output module may facilitate the output of light beams (laser beams) via light source A 120 or light source B 125. The wave output module 172 may interface with light source A 120 or light source B 125 to output the light beams. For example, the wave output module 172 may tune light source A 120 to a particular power and wavelength in order to output a light beam via light source A 120 at the particular power and wavelength. Similarly, the wave output module 172 may tune light source B 125 to a particular power and wavelength in order to output a light beam via light source B 125 at the particular power and wavelength. Additionally, wave output module 172 may configure light source A 120 and/or light source B 125 to output the light beams in a beam scanning fashion such that the outputted light beams are continuously scanning across the FOV. In some implementations, the wave output module 172 may first interface with light source A 120 to beam scan the entire FOV with light beams at a first wavelength and a first power. The first power may be a power that may not have the risk of causing damage to a sensitive object (e.g., an eye). After beam scanning the entire FOV with light source A 120, the distance calculation module 174 may calculate a distance to one or more objects within the FOV (described in further detail below). The wave output module is an example of means for means for outputting, toward a field of view (FOV), at least one propagated wave at a first power. The wave output module is also an example of means for outputting, toward the safe area, the at least one propagated wave at the second power.

The wave output module 172 may also interface with the RADAR system 150 and SONAR system 160 to output RADAR and SONAR waves, respectively.

Distance calculation module 174 may be configured to, when executed by processor 110, calculate a distance to one or more objects within the FOV based on reflected waves reflected from the waves output by the wave output module 172. For example, distance calculation module 174 may interface with the sensor 130 in order to obtain measurements from the sensor 130 from reflected light reflected from the light beams and detected by the sensor 130. Based on the measurements, the distance calculation module 174 may calculate the distance to one or more objects within the FOV. In some implementations, the distance calculation module 174 may determine the distance to one or more objects within the FOV based on data collected from a sensor (e.g., images of the FOV captured by a camera). The distance calculation module 174 is an example of means for calculating a distance to the one or more objects within the FOV based at least in part on the measured characteristic of the received reflection of the at least one propagated wave at the first power. The distance calculation module 174 is also an example of means for calculating a distance to the one or more objects within the safe area based at least in part on the measured characteristic of the received reflection of the at least one propagated wave at the second power.

The wave output module 172 may also interface with the RADAR system 150 and SONAR system 160 to output RADAR and SONAR waves, respectively.

FOV classification module 176 may be configured to, when executed by processor 110, classify the FOV into one or more areas. The one or more areas may include safe areas and unsafe areas. The safe areas may be areas deemed to be safe to receive a light beam at a second power level without the risk of harm to a sensitive object (e.g. an eye) within the FOV. The unsafe areas may be areas deemed to be unsafe to receive a light beam at the second power level due to the risk of harm to a sensitive object within the FOV. The FOV classification module 176 is an example of means for classifying one or more areas within the FOV into safe areas and unsafe areas based at least in part on the received reflection of the propagated wave at the first power, wherein the safe areas are deemed to be safe to receive at least one propagated wave at a second power.

In order to classify the FOV into the one or more areas, the FOV classification module 176 may interface with one or more sensors and/or one or more modules. For example, the FOV classification module 176 may interface with the wave output module 172 and the distance calculation module 174 in order to classify the FOV into the one or more areas. As described above, the wave output module 172 may, via light source B 125, beam scan the entire the FOV. The reflected light from beam scan reflected off one or more objects with the FOV may be detected by the sensor 130, and the distance calculation module 174 may calculate a distance to the one or more objects within the FOV based on the reflected light detected by the sensor 130. As described above, light source A 120 may output light at a first power and a first wavelength that is considered low power and safe for contact with any potential sensitive objects within the FOV. The light beams output by light source A 120 may be useful for distance calculation (ranging) up to a certain distance, D1.

Upon the distance calculation module 174 calculating the distances to the one or more objects within the FOV, the FOV classification module 176 may classify the FOV into one or more safe and unsafe areas based on the calculated distances. For example, any areas within the FOV having detected objects (e.g., objects less than distance D1) may be classified as unsafe areas, where it would be unsafe to transmit a higher power laser (e.g., the light beams from light source B 125) without the risk of potentially causing damage to the one or more objects (if the objects included a sensitive object such as an eye). Any areas within the FOV determined to not have objects (e.g., areas where the objects are at a distance greater than D1) may be classified as safe areas, where it would be safe to transmit a higher power laser (e.g., the light beams from light source B 125) without the risk of potentially causing damage to objects at a distance greater than D1.

Figure 3:
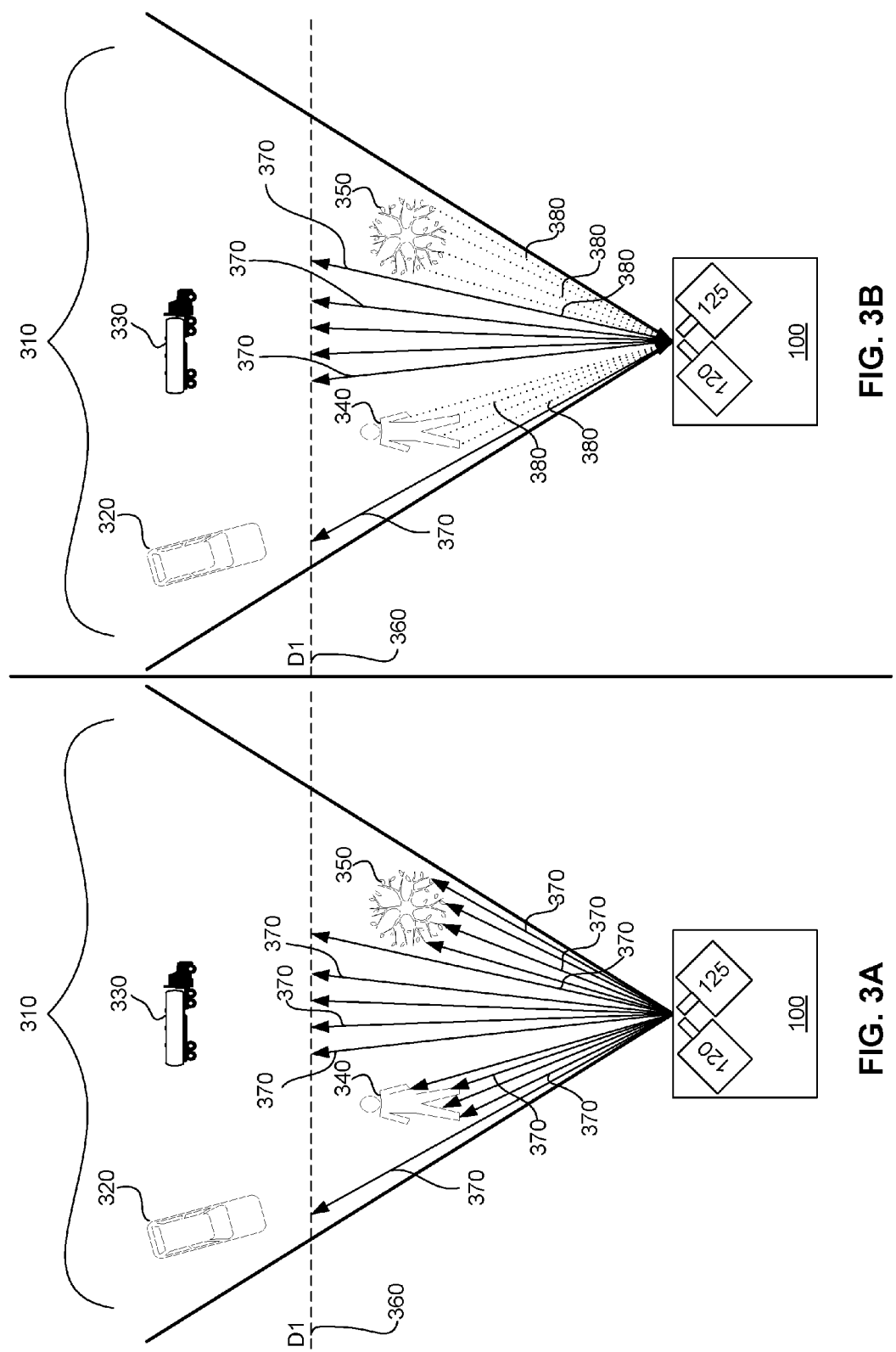
FIG. 3A illustrates outputting light beams at a second power level and a second wavelength in order to classify a FOV, according to some implementations.
FIG. 3B illustrates receiving reflected light beams in order to classify a FOV, according to some implementations.

FIG. 3A illustrates outputting light beams at a first power level and a first wavelength in order to classify a FOV 310, according to some implementations. A FOV 310 exists in front of the system 100. The FOV 310 contains multiple objects, such as a car 320, truck 330, person 340, and tree 350. The system 100 includes light source A 120 and light source B 125.

Light source A 120 may be configured to output light beams at a first wavelength and a first power. Light source B 125 may be configured to output light beams at a second wavelength and a second power. The second power may be a higher power that is capable of being used for ranging at greater distances as compared to the first power. However, light beams output at the second power may not be safe for contact with sensitive objects within the FOV 310. For example light beams output at the second power by light source B 125 may not be safe for contact with person 340.

In order to classify the FOV 310 into one or more areas (e.g., safe areas and unsafe areas), the system 100 may initially beam scan the entire FOV 310 by outputting light beams 370 via light source A 120. As described earlier, light source A 120 may be configured to output light beams 370 at a first power and a first wavelength. The light source A 120 may be configured to output light beams 370 according to parameters by the wave output module 172 (FIG. 2). Since the FOV 310 includes a sensitive object (e.g., person 340), it would not be advisable to output a higher power light beam toward the person 340 as it may cause damage to the person's 340 eye. Instead, the lower power light beam output by light source A 120 may initially be used across the entire FOV 310 since there is less risk of causing damage to the person's 340 eye. The light beams 370 output by light source A 120 may be useful in ranging up to a distance D1 360. In some implementations, the first wavelength of the light beams 370 output by light source A 120 may be a wavelength in the near infrared.

It can be appreciated that the light beams 370 output by light source A 120 may extend beyond distance D1 360, but for purposes of the illustration the light beams 370 are shown as extending up to distance D1 360. In other words, the light beams 370 output by light source A 120 may be safe for contact with sensitive objects at distances less than distance D1 360. Further, while the system 100 is shown as having two light sources (light source A 120 and light source B 125), a single light source may also be used to output light beams at both the first power and first wavelength and the second power and second wavelength.

In some implementations the beam scanning illustrated in FIG. 3A may be performed on a continuing basis and in real-time. That is, the system 100 may continuously beam scan the FOV 310. For example, if the system 100 was affixed to a vehicle for purposes of aiding an intelligent cruise control system, the system 100 can continuously scan for objects in front of the vehicle as the objects in front of the vehicle may dynamically change as the vehicle progresses forward.

Upon beam scanning the entire FOV 310 with light source A 120, the LIDAR system may receive a number of reflected light beams that can be used in determining the presence/distance of objects within the FOV 310, which is described in further detail below.

FIG. 3B illustrates receiving reflected light beams in order to classify a FOV 310, according to some implementations. After the light beams 370 are output by light source A 120, the system 100 may receive a number of reflected light beams 380 reflected off of certain objects with the FOV 310. These objects may be within distance D1 360. Some reflected light beams may be also be reflected off of objects further than distance D1 360, but the intensity of these reflected light beams may be weaker. For purposes of this illustration, reflected light beams 380 are shown as being reflected off objects only within distance D1 360. As mentioned above, the outputted light beams 370 may be safe for contact with sensitive objects at distances less than distance D1 360. The reflected light beams 380 may be received by the sensor 130 (FIG. 2). Sensor 130 may be configured to measure characteristics of the reflected light beams 380. Distance calculation module 174 (FIG. 2) may then interface with the sensor 130 (FIG. 2) to calculate a distance to the objects off which generated reflected light beams 380 from the outputted light beams 370. In this example, these objects include the person 340 and the tree 350. In addition to calculating the distance to the person 340 and the tree 350, the distance calculation module 174 (FIG. 2) may also be able to achieve a 2-D or 3-D representation of the entire FOV 310.

Based on calculated distances and/or representation of the FOV 310 determined by the distance calculation module 174 (FIG. 2), the system 100 may be able to classify the FOV 310 into safe and unsafe areas. That is, the system 100 may be able to classify the FOV 310 into one or more areas where it may be safe to output a higher power light beam (e.g., areas where no objects are present within distance D1 360) and areas where it may not be safe to output a higher power light beam (e.g., areas where objects are present within distance D1 360). It can be appreciated that any combination of areas within the FOV 310 can be classified by the system 100. For example, the entire FOV 310 may be classified a safe area. In another example, the entire FOV 310 may be classified an unsafe area. In some implementations, the FOV 310 may be classified with any combination of safe and unsafe areas.

In some implementations the distance calculation illustrated in FIG. 3B may be performed on a continuing basis and in real-time. That is, the system 100 may continuously receive the reflected light beams 380 off one or more objects within the FOV 310. For example, if the system 100 was affixed to a vehicle for purposes of aiding an intelligent cruise control system, the system 100 can continuously receive reflected light beams 380 reflected off objects in front of the vehicle, as the objects in front of the vehicle may dynamically change as the vehicle progresses forward. Thus, the system 100 may be able to construct a 2-D or 3-D representation of objects in front of the vehicle in real-time.

The classification of the FOV 310 into the one or more areas is described in further detail below.

Figure 4:
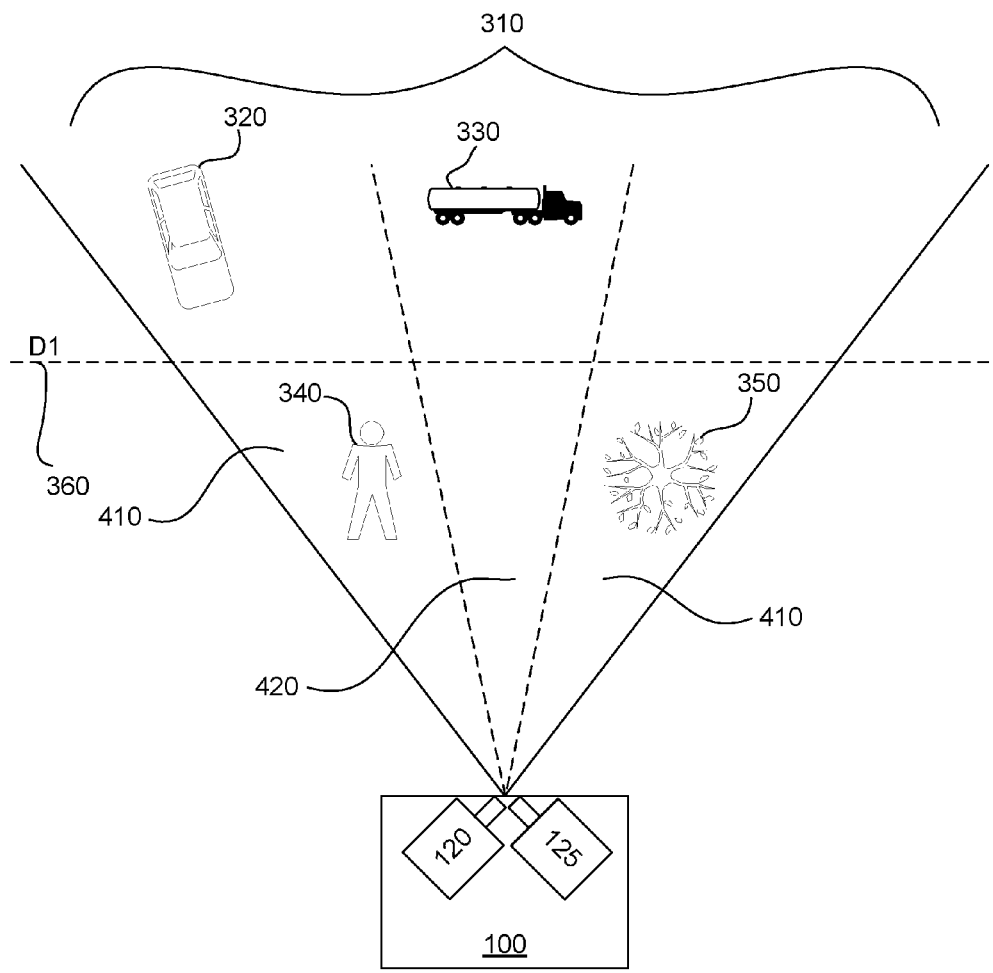
FIG. 4 illustrates classifying a FOV into one or more areas, according to some implementations.

FIG. 4 illustrates classifying a FOV 310 into one or more areas, according to some implementations. After the system 100 receives the reflected light beams reflected off one or more objects within the FOV 310, the system 100 may classify the FOV 310 into one or more areas. The classification may be carried out by the FOV classification module 176 (FIG. 2). The one or more zones may include one or more safe zones and one or more unsafe zones. As described above, any areas within the FOV having detected objects (e.g., objects less than distance D1) may be classified as unsafe areas, where it would be unsafe to transmit a higher power laser (e.g., the light beams from light source B 125) without the risk of potentially causing damage to the one or more objects (if the objects included a sensitive object such as an eye). Any areas within the FOV determined to not have objects (e.g., areas where the objects are at a distance greater than D1) may be classified as safe areas, where it would be safe to transmit a higher power laser (e.g., the light beams from light source B 125) without the risk of potentially causing damage to objects at a distance less than D1.

As shown in FIG. 4, the FOV 310 has been classified into two unsafe areas 410 and a safe area 420. The unsafe areas 410 have been classified as unsafe because of the presence of the person 340 and the tree 350. These unsafe areas 410 may be unsafe to output a higher power laser (e.g., the light beams from light source B 125) without the risk of potentially causing damage to one or more sensitive objects (e.g. the person 340). While it may still be safe to output a high power laser (e.g., the light beams from light source B 125) toward the area including the tree 350, the system 100 may assume that all areas with the presence of one or more objects within distance D1 360 may be unsafe areas 410 because the object could potentially be a sensitive object such as a person or animal.

As described above, the System 100 performs the output of the series of light beams (e.g., beam scanning) and calculation of the distance to the objects within the FOV 310 in real-time. Accordingly, the classification of the one or more areas may also change in real-time based on any changes in, addition of, or removal of objects within the FOV 310. For example, in the vehicle illustration discussed above, the classifications of the one or more areas may change in real-time as the vehicle progresses forward and the objects within the FOV 310 move, new objects are introduced within the FOV 310, or existing objects leave the FOV 310.

Figure 5:
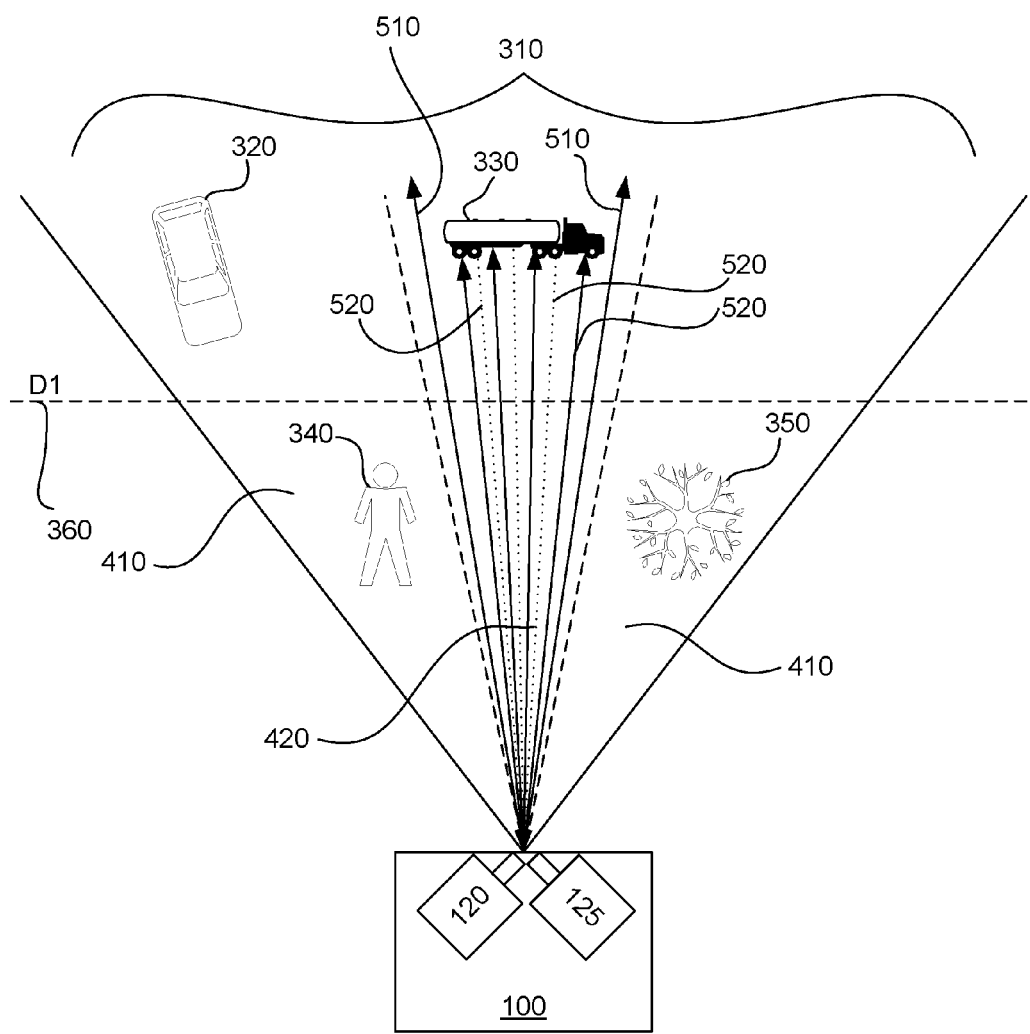
FIG. 5 illustrates outputting light beams at a first power level and a first wavelength for ranging objects at a further distance, according to some implementations.

FIG. 5 illustrates outputting light beams at a second power level and a second wavelength for ranging objects at a further distance, according to some implementations. After the classification of the FOV 310 into unsafe areas 410 and safe areas 420 is complete, the system 100 may output higher power (as compared to lower power light beams 370) light beams 510 into the safe area 420. Since, during the classification phase, a determination was made that the FOV 310 does not contain any objects (e.g., sensitive objects) at a distance less than distance D1 360, the system 100 may safely output higher power light beams 510 into the safe area 420 for ranging objects that may be present within the FOV 310 at a distance greater than distance D1 360. In this example, the truck 330 is present within the FOV 310 at a distance greater than distance D1 360.

As described above, light source B 125 may be configured to output light beams at a second wavelength and a second power. The second power may be a higher power that is capable of being used for ranging at greater distances as compared to the first power. Light beams output at the second power by light source B 125 may not be safe for contact with person 340. However, since during the classification phase, a determination was made that the FOV 310 does not contain any objects (e.g., sensitive objects) at a distance less than distance D1 360, the system 100 may safely output higher power light beams 510 into the safe area 420 for ranging objects that may be present within the FOV 310 at a distance greater than distance D1 360. Similar to light source A 120, light source B 125 may also output the higher power light beams 510 in a beam scanning fashion such that the entire safe area 420 is scanned with the higher power light beams 510. In turn, the system 100 (via sensor 130 and distance calculation module 174) may calculate a distance to the objects (e.g., truck 330) within the safe area 420 and also generate a 2-D or 3-D representation of the objects within the safe area 420. The calculation and construction of the representation may be done based on reflected light beams 520 reflected off of objects within the safe are 420 in response to outputting the high power light beams 510.

In some implementations the beam scanning illustrated in FIG. 5 may be performed on a continuing basis and in real-time. That is, the system 100 may continuously beam scan the safe area 420. For example, if the system 100 was affixed to a vehicle for purposes of aiding an intelligent cruise control system, the system 100 can continuously scan for objects in front of the vehicle and located within the safe area 420 as the objects in front of the vehicle may dynamically change as the vehicle progresses forward. Additionally, as described above, the classification of the safe area 420 may change based on changes in, or the presence of, objects in front of the system 100. That is, another safe area 420 may be classified in real-time by the FOV classification module 176 (FIG. 2) and the high power light beams 510 may then be output by light source B 125 into the newly classified safe area(s).

In some implementations, the system 100 may include wavelength filters to isolate light source A 120 and light source B 125 from interfering with each other. Thus, light source A 120 and light source B 125 may continuously beam scan the unsafe areas 410 and safe areas 420 within the FOV 310 without the high power light beams 510 and low power light beams 370 interfering with one another. In some implementations, the second wavelength of the light beams 510 output by light source B 125 may be a wavelength in the near infrared that is different than the first wavelength.

Together, the above the described system 100 may provide for continuous beam scanning of the FOV 310 for ranging and/or 2-D or 3-D representation construction of objects at various distances within the FOV 310, without the risk of causing damage to a sensitive object within the FOV 310 due to higher power light beams.

Figure 6:
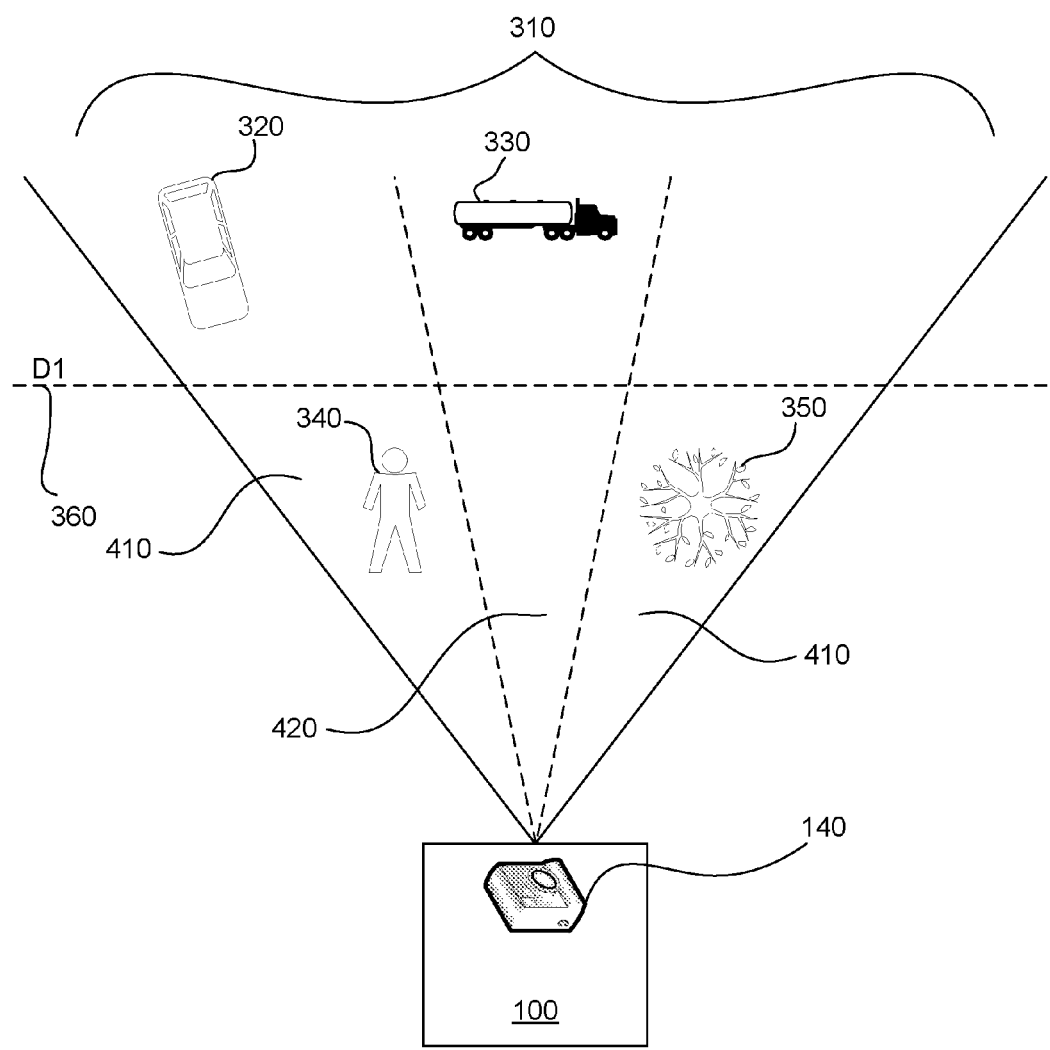
FIG. 6 illustrates classifying a FOV into one or more areas using a sensor, according to some implementations.

FIG. 6 illustrates classifying a FOV 310 into one or more areas using a sensor, according to some implementations. In this example, the sensor is a camera 140. In some implementations, a sensor (such as camera 140) may be used to scan the FOV 310 and determine the presence of objects at a distance less than distance D1 360 from the System 100. The sensor may be used instead of beam scanning the FOV 310 with the lower power light beams as illustrated in FIG. 3A. The camera 140 may continuously capture image frames of the FOV 310 in front of the System 100. The distance calculation module 174 (FIG. 2) may then determine a distance to the one or more objects based on the images captured by the camera 140. In some implementations, the camera 140 may be a depth-camera or a stereo-camera. After determining the distances to the one or more objects within the FOV 310 based on images captured by the camera 140, the FOV classification module 176 (FIG. 2) may classify the FOV 310 into safe and unsafe areas using the methods described above. The system 100 may then output low power light beams and high power light beams for ranging of the one or more objects within the unsafe areas 410 and safe areas 420 respectively, similar to the methods described above.

Additional Embodiments

As described above, the amount of laser light that a LIDAR system may safely emit may be guided by three restrictions: (1) the maximum energy in a single laser light pulse entering a human eye; (2) the maximum energy per pulse in in a chain of pulses entering a human eye; and (3) the average laser power that enters a human eye.

Since all laser beams converge or diverge (possibly at a slow rate, such as 0.1 degrees), the eye's distance from the emitting laser source will affect the amount of light that the eye is exposed to. In addition, the distance from a scanning LIDAR will also affect the number of spots of the scan that may overlap with the eye. A LIDAR/LADAR is able to estimate this distance, therefore that information may be used to optimize the laser's single pulse energy, pulse repetition rate, and average power.

Skin and eyes are able to be detected and ranged by the LIDAR system at a very high certainty. Wavelengths typically used for LIDAR (for a variety of advantageous reasons such as component availability and cost, invisibility, less sunlight, and decreased eye focusing) are near infrared (e.g. 850 nm, 880 nm, 905 nm, 940 nm wavelength). Human skin is very reflective (~50%) at near-infrared wavelengths, and this has very little variation between different skin colors. In other words, black, brown and white skin may appear different in visible light, but are similarly reflective in the invisible near-infrared wavelengths. In addition, the front surface of the human eye is reflective due to its high water content and Fresnel reflections, and will reflect back 2% or more of the incident light. Therefore, if a human or animal is coincident with the laser beam, the LIDAR system will be able to calculate the distance.

Multiple-Phase Energy Optimization

In LIDAR systems where the laser source is considered an extended source (e.g., a VCSEL laser array used in a flash LIDAR system), the amount of allowable energy in a pulse is reduced depending on the number of pulses that the eye is exposed to. For example, the allowed pulse energy may decrease by a factor of 0-0.25), where n is the number of pulses. Using the measured range to the detected object to determine the number of pulses that the eye may be exposed to, can allow for the average energy per pulse to be below the allowable limit. The goal may be to maximize the number of pulses to maximize the distance resolution (in the case of averaging) or the refresh rate of the sensor.

Single Pulse Energy Optimization

The LIDAR may be limited by the single pulse energy in detecting objects a long distance away. By emitting test pulses to check the presence of objects at shorter distances, the LIDAR may ramp up its single pulse energy to increase its range.

For this method, the number of distance steps allowed depends on modeling the maximum speed at which an object may enter the field of view of the laser beam, as compared to the amount of time it takes to perform the measurement. The system would not be eye safe if an eye could move into the laser beam between the lower energy pulse and the second measurement pulse. For example, in an automotive use case, the eye may be moving 60 miles-an-hour (27,000 mm/s) relative to the LIDAR. If the eye is 7 mm in size, it would take 260 microseconds to enter the field of view of the laser beam. This single-pulse optimization method would need to be performed in a time period much less than 260 microseconds.

Sensor Fusion Power Optimization

In many LIDAR/LADAR systems, the LIDAR is used in conjunction with a secondary sensor, such as a camera, stereo-camera, RADAR, SONAR, etc. Typically, the LIDAR gives a much more precise and detailed point-cloud of 3D distances to objects than the secondary sensor, but the secondary sensor could be used to determine areas in which scanning power could be increased.

Exemplary Computing System

Figure 7:
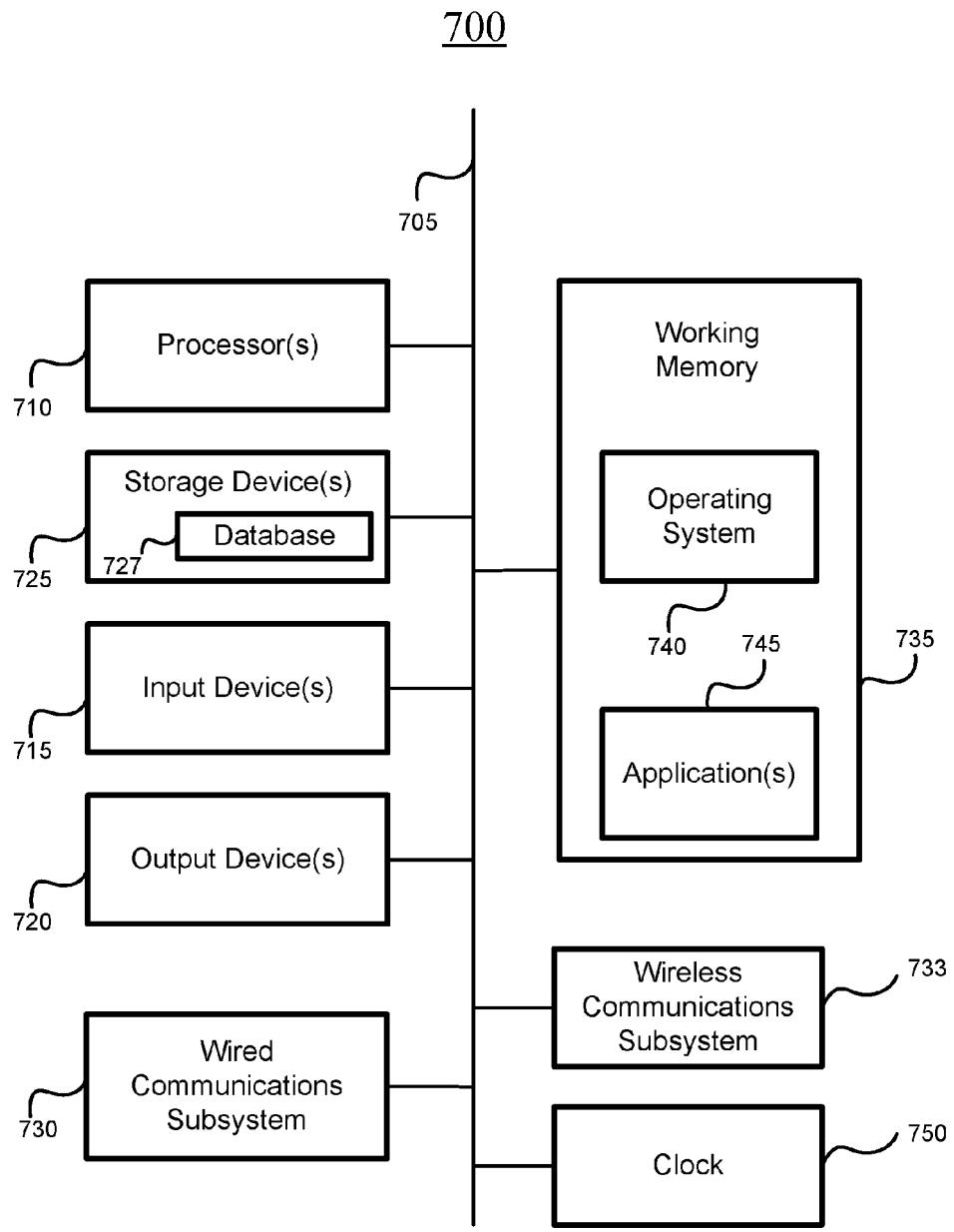
FIG. 7 illustrates components of an example computing system 800 for implementing some of the examples described herein.

FIG. 7 illustrates components of an example computing system 700 for implementing some of the examples described herein. For example, computing system 700 can be used to control System 100. It should be noted that FIG. 7 is meant only to provide a generalized illustration of various components, any or all of which may be utilized as appropriate. Moreover, system elements may be implemented in a relatively separated or relatively more integrated manner.

Computing system 700 is shown comprising hardware elements that can be electrically coupled via a bus 705 (or may otherwise be in communication, as appropriate). The hardware elements may include a processing unit 710, one or more input devices 715, and one or more output devices 720. Input device(s) 715 can include without limitation camera(s), a touchscreen, a touch pad, microphone(s), a keyboard, a mouse, button(s), dial(s), switch(es), and/or the like. Output devices 720 may include without limitation a display device, a printer, light emitting diodes (LEDs), speakers, and/or the like.

Processing unit 710 may include without limitation one or more general-purpose processors, one or more special-purpose processors (such as digital signal processing (DSP) chips, graphics acceleration processors, application specific integrated circuits (ASICs), and/or the like), and/or other processing structures or means, which can be configured to perform one or more of the methods described herein.

Computing system 700 can also include a wired communications subsystem 730 and a wireless communications subsystem 733. Wired communications subsystem 730 and wireless communications subsystem 733 can include, without limitation, a modem, a network interface (wireless, wired, both, or other combination thereof), an infrared communication device, a wireless communication device, and/or a chipset (such as a Bluetooth™ device, an IEEE 802.11 device (e.g., a device utilizing one or more of the IEEE 802.11 standards described herein), a WiFi device, a WiMax device, Long-Term Evolution (LTE) device, cellular communication facilities, etc.), and/or the like. Subcomponents of the network interface may vary, depending on the type of computing system 700. Wired communications subsystem 730 and wireless communications subsystem 733 may include one or more input and/or output communication interfaces to permit data to be exchanged with a data network, wireless access points, other computer systems, and/or any other devices described herein.

Depending on desired functionality, wireless communications subsystem 733 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 1002.16) network or a LTE network. A WLAN may be, for example, an IEEE 802.11x network. A WPAN may be, for example, a Bluetooth network, an IEEE 802.15x, or some other types of network. The techniques described herein may also be used for any combination of WWAN, WLAN and/or WPAN.

Computer system 700 of FIG. 7 may include a clock 750 on bus 705, which can generate a signal to synchronize the various components on bus 705. Clock 750 may include an LC oscillator, a crystal oscillator, a ring oscillator, a digital clock generator such as a clock divider or clock multiplexer, a phase locked loop, or other clock generator. The clock may be synchronized (or substantially synchronized) with corresponding clocks on other devices while performing the techniques described herein.

Computing system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like. For instance, storage device(s) 725 may include a database 727 (or other data structure) configured to store detected signals as described in embodiments herein.

In many embodiments, computing system 700 may further comprise a working memory 735, which can include a RAM or ROM device, as described above. Software elements, shown as being currently located within working memory 735, can include an operating system 740, device drivers, executable libraries, and/or other code, such as one or more application programs 745, which may comprise software programs provided by various embodiments, and/or may be designed to implement methods, and/or configure systems, provided by other embodiments, as described herein. Merely by way of example, one or more procedures described with respect to the method discussed above might be implemented as code and/or instructions executable by a computer (and/or a processor within a computer). In an aspect, such code and/or instructions can be used to configure and/or adapt a general purpose computer (or other device) to perform one or more operations in accordance with the described methods.

A set of these instructions and/or code might be stored on a non-transitory computer-readable storage medium, such as non-transitory storage device(s) 725 described above. In some cases, the storage medium might be incorporated within a computer system, such as computing system 700. In other embodiments, the storage medium might be separate from a computer system (e.g., a removable medium, such as a flash drive), and/or provided in an installation package, such that the storage medium can be used to program, configure, and/or adapt a general purpose computer with the instructions/code stored thereon. These instructions might take the form of executable code, which is executable by computing system 700 and/or might take the form of source and/or installable code, which, upon compilation and/or installation on computing system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and," "or," and "an/or," as used herein, may include a variety of meanings that also are expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein may be presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A method for sensing one or more objects comprising:
   outputting, via a propagation wave source and toward a field of view (FOV), at least one propagated wave at a first power;
   receiving, via a sensor, a reflection of the at least one propagated wave at the first power reflected off one or more objects within the FOV;
   sensing, via a processor, the one or more objects within the FOV based at least in part on the reflection of the at least one propagated wave;
   classifying, via the processor, one or more areas within the FOV into safe areas and unsafe areas based at least in part on the sensed one or more objects, wherein the safe areas are deemed to be safe to receive at least one propagated wave at a second power;
   outputting, via the propagation wave source and toward the safe area, the at least one propagated wave at the second power; and
   performing, via the processor, a ranging operation based on the at least one propagated wave at the second power.

2. The method of claim 1, wherein the unsafe areas are deemed to be unsafe to receive the at least one propagated wave at the second power.

3. The method of claim 1, further comprising continuing to output, via the propagation wave source and toward the unsafe area, the at least one propagated wave at the first power.

4. The method of claim 1, further comprising:
   measuring a characteristic of the received reflection of the at least one propagated wave at the first power reflected off one or more objects within the FOV; and
   calculating a distance to the one or more objects within the FOV based at least in part on the measured characteristic of the received reflection of the at least one propagated wave at the first power.

5. The method of claim 1, further comprising:
   receiving, via the sensor, a reflection of the at least one propagated wave at the second power reflected off one or more objects within the safe area;
   measuring a characteristic of the received reflection of the at least one propagated wave at the second power reflected off one or more objects within the safe area; and
   calculating a distance to the one or more objects within the safe area based at least in part on the measured characteristic of the received reflection of the at least one propagated wave at the second power.

6. The method of claim 1, wherein the at least one propagated wave at the first power is output at a first wavelength and the at least one propagated wave at the second power is output at a second wavelength.

7. The method of claim 6, wherein the first wavelength is a wavelength in the near infrared and the second wavelength is a different wavelength in the near infrared.

8. The method of claim 1, wherein the propagation wave source comprises at least one of a light detection and ranging (LIDAR) source, radio detection and ranging (RADAR) source, or sound navigation and ranging (SONAR) source.

9. The method of claim 1, wherein sensing the one or more objects within the FOV comprises determining the characteristics of the one or more objects, wherein the characteristics of the one or more objects comprises a distance between the one or more objects and the sensor.

10. A system for sensing one or more objects, comprising:
    a propagation wave source configured to output propagated waves;
    a sensor configured to receive a reflection of propagated waves;
    a processor coupled to the propagation wave source and the sensor, the processor configured to:
      output, via the propagation wave source and toward a field of view (FOV), at least one propagated wave at a first power;
      receive, via the sensor, a reflection of the at least one propagated wave at the first power reflected off one or more objects within the FOV;
      sense the one or more objects within the FOV based at least in part on the reflection of the at least one propagated wave
      classify one or more areas within the FOV into safe areas and unsafe areas based at least in part on the sensed one or more objects, wherein the safe areas are deemed to be safe to receive at least one propagated wave at a second power;
      output, via the propagation source and toward the safe area, the at least one propagated wave at the second power; and
      perform, via the processor, a ranging operation based on the at least one propagated wave at the second power.

11. The system of claim 10, wherein the unsafe areas are deemed to be unsafe to receive the at least one propagated wave at the second power.

12. The system of claim 10, wherein the processor is further configured to continue to output, via the propagation wave source and toward the unsafe area, the at least one propagated wave at the first power.

13. The system of claim 10, wherein the processor is further configured to:
measure a characteristic of the received reflection of the at least one propagated wave at the first power reflected off one or more objects within the FOV; and
calculate a distance to the one or more objects within the FOV based at least in part on the measured characteristic of the received reflection of the at least one propagated wave at the first power.

14. The system of claim 10, wherein the processor is further configured to:
receive, via the sensor, a reflection of the at least one propagated wave at the second power reflected off one or more objects within the safe area;
measure a characteristic of the received reflection of the at least one propagated wave at the second power reflected off one or more objects within the safe area; and
calculate a distance to the one or more objects within the safe area based at least in part on the measured characteristic of the received reflection of the at least one propagated wave at the second power.

15. The system of claim 10, wherein the at least one propagated wave at the first power is output at a first wavelength and the at least one propagated wave at the second power is output at a second wavelength.

16. The system of claim 10, wherein the first wavelength is a wavelength in the near infrared and the second wavelength is a different wavelength in the near infrared.

17. The system of claim 10, wherein the propagation wave source comprises at least one of a light detection and ranging (LIDAR) source, radio detection and ranging (RADAR) source, or sound navigation and ranging (SONAR) source.

18. An apparatus for sensing one or more objects comprising:
means for outputting, toward a field of view (FOV), at least one propagated wave at a first power;
means for receiving a reflection of the at least one propagated wave at the first power reflected off one or more objects within the FOV;
means for sensing the one or more objects within the FOV based at least in part on the reflection of the at least one propagated wave;
means for classifying one or more areas within the FOV into safe areas and unsafe areas based at least in part on the sensed one or more objects, wherein the safe areas are deemed to be safe to receive at least one propagated wave at a second power;
means for outputting, toward the safe area, the at least one propagated wave at the second power; and
means for performing a ranging operation based on the at least one propagated wave at the second power.

19. The apparatus of claim 18, wherein the unsafe areas are deemed to be unsafe to receive the at least one propagated wave at the second power.

20. The apparatus of claim 18, further comprising means for continuing to output, toward the unsafe area, the at least one propagated wave at the first power.

21. The apparatus of claim 18, further comprising:
means for measuring a characteristic of the received reflection of the at least one propagated wave at the first power reflected off one or more objects within the FOV; and
means for calculating a distance to the one or more objects within the FOV based at least in part on the measured characteristic of the received reflection of the at least one propagated wave at the first power.

22. The apparatus of claim 18, further comprising:
means for receiving a reflection of the at least one propagated wave at the second power reflected off one or more objects within the safe area;
means for measuring a characteristic of the received reflection of the at least one propagated wave at the second power reflected off one or more objects within the safe area; and
means for calculating a distance to the one or more objects within the safe area based at least in part on the measured characteristic of the received reflection of the at least one propagated wave at the second power.

23. The apparatus of claim 18, wherein the at least one propagated wave at the first power is output at a first wavelength and the at least one propagated wave at the second power is output at a second wavelength.

24. The apparatus of claim 18, wherein the propagation wave source comprises at least one of a light detection and ranging (LIDAR) source, radio detection and ranging (RADAR) source, or sound navigation and ranging (SONAR) source.

25. One or more non-transitory computer-readable media storing computer-executable instructions that, when executed, cause one or more computing devices to:
output, toward a field of view (FOV), at least one propagated wave at a first power;
receive a reflection of the at least one propagated wave at the first power reflected off one or more objects within the FOV;
sense the one or more objects within the FOV based at least in part on the reflection of the at least one propagated wave;
classify one or more areas within the FOV into safe areas and unsafe areas based at least in part on the sensed one or more objects, wherein the safe areas are deemed to be safe to receive at least one propagated wave at a second power;
output, toward the safe area, the at least one propagated wave at the second power; and
perform a ranging operation based on the at least one propagated wave at the second power.

26. The non-transitory computer-readable media of claim 25, wherein the unsafe areas deemed to be unsafe to receive the at least one propagated wave at the second power.

27. The non-transitory computer-readable media of claim 25, wherein the instructions that, when executed, further cause the one or more computing devices to continue to output, toward the unsafe area, the at least one propagated wave at the first power.

28. The non-transitory computer-readable media of claim 25, wherein the instructions that, when executed, further cause the one or more computing devices to:
measure a characteristic of the received reflection of the at least one propagated wave at the first power reflected off one or more objects within the FOV; and
calculate a distance to the one or more objects within the FOV based at least in part on the measured characteristic of the received reflection of the at least one propagated wave at the first power.

29. The non-transitory computer-readable media of claim 25, wherein the instructions that, when executed, further cause the one or more computing devices to:
   receive a reflection of the at least one propagated wave at the second power reflected off one or more objects within the safe area;
   measure a characteristic of the received reflection of the at least one propagated wave at the second power reflected off one or more objects within the safe area; and
   calculate a distance to the one or more objects within the safe area based at least in part on the measured characteristic of the received reflection of the at least one propagated wave at the second power.

30. The non-transitory computer-readable media of claim 25, wherein the at least one propagated wave at the first power is output at a first wavelength and the at least one propagated wave at the second power is output at a second wavelength.

31. The non-transitory computer-readable media of claim 25, wherein the propagation wave source comprises at least one of a light detection and ranging (LIDAR) source, radio detection and ranging (RADAR) source, or sound navigation and ranging (SONAR) source.

* * * * *